INVENTOR.
Roland P. Hammond, Walter R. Wykoff
Harold M. Busey

June 14, 1960   R. P. HAMMOND ET AL   2,940,915
HIGH TEMPERATURE, HIGH POWER HETEROGENEOUS NUCLEAR REACTOR
Filed May 5, 1958   5 Sheets-Sheet 2

WITNESSES:

INVENTOR.
Roland P. Hammond, Walter R. Wykoff
Harold M. Busey
BY

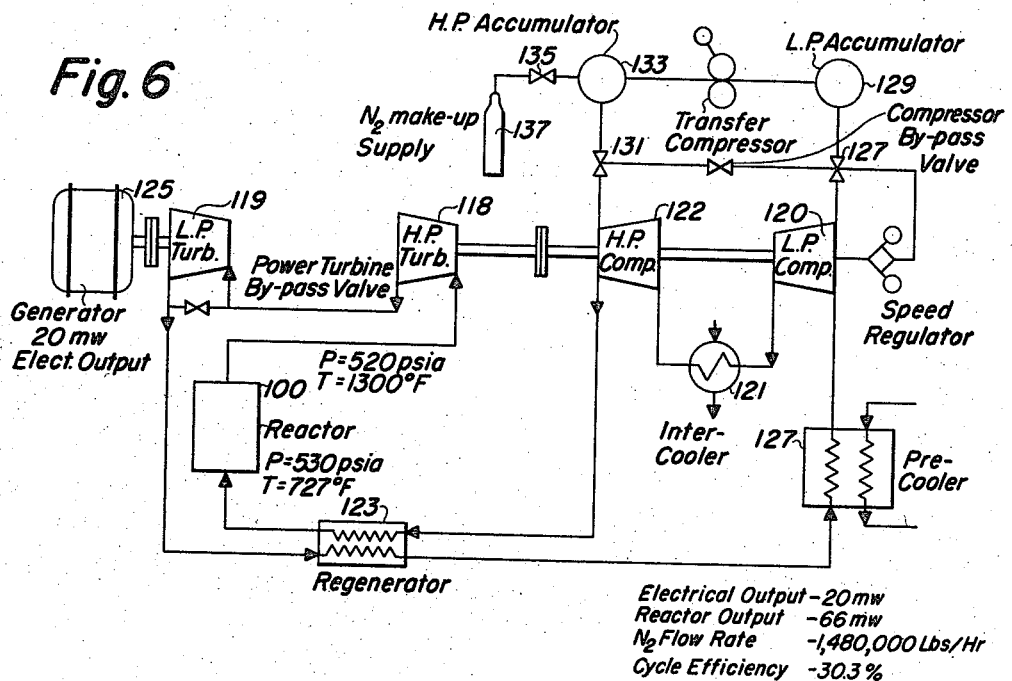
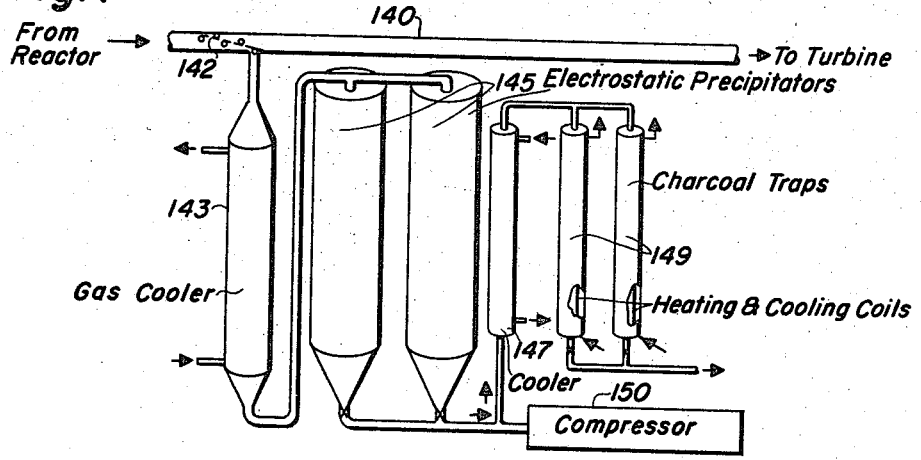

United States Patent Office 2,940,915
Patented June 14, 1960

2,940,915

HIGH TEMPERATURE, HIGH POWER HETEROGENEOUS NUCLEAR REACTOR

Roland Philip Hammond, Harold M. Busey, and Walter Robert Wykoff, Los Alamos, N. Mex., assignors to the United States of America as represented by the United States Atomic Energy Commission Filed May 5, 1958, Ser. No. 733,218

10 Claims. (Cl. 204—154.2)

This invention relates to nuclear power reactors and more particularly to a heterogeneous gas-cooled power reactor.

Heterogeneous gas-cooled reactors are present in the prior art but are subject to a number of objections when utilized for the generation of appreciable amounts of power. One example of a heterogeneous gas-cooled nuclear reactor is in operation at Oak Ridge National Laboratory, Oak Ridge, Tennessee, and is described on pages 433, et seq. of the Source Book on Atomic Energy, Second Edition, by Samuel Glasstone, published by D. Van Nostrand Company, Inc., Princeton, New Jersey. This reactor, known as the "Intermediate Air-Cooled Oak Ridge Reactor," is built as a cube of graphite containing a number of horizontal channels in which the metallic uranium is supported in the form of cylinders or slugs enclosed in hermetic aluminum casings. The metallic uranium fuel elements are slid into the channels in the graphite which are somewhat wider than the slugs, thus providing space for the flow of air for cooling purposes. When the uranium slugs are ready for processing, i.e., when they have reached a state of burnup, such as to have become insufficient for energy generation at the required level, they are pushed out at the back of the reactor while new ones are fed in at the front. Control of the neutron density is achieved by means of boron steel rods. The reactor core is enclosed in heavy shielding to protect operating personnel from the harmful effects of penetrating neutron and gamma radiations. An elevator is provided which can be raised and lowered along the front face of the reactor so that an operator can, one at a time, insert fresh fuel elements into the reactor core. The insertion of a fuel element through the front wall of the reactor pushes the spent, but radioactive core out of the back wall of the reactor.

The prior art reactors of the heterogeneous type above described are deficient in certain respects for normal power plant duty. A high level power output nuclear reactor is desirably capable of continuously sustaining its power output at a substantially uniform level. This requirement makes it desirable that fuel elements can be replaced on a time schedule basis without shutdown of the reactor. Another desirable feature in the interest of avoiding destructive stresses in the reactor structure is that the power generating density throughout the reactor core should be substantially uniform and this requires that there be a lower level of energy generation in the central region of the core than there is in the outer regions of the core.

It is, accordingly, one prime purpose of the present invention to provide a heterogeneous gas-cooled graphite moderated nuclear power reactor which is capable of continuous operation at full power and with respect to which the replacement of fuel elements is a continuous, convenient, and safe operation.

Generally stated, these and other objectives and advantages are obtained by the present invention by providing a reactor in which the core supports the fuel elements in radial channels and is arranged as a rotor or turret within the stationary reflector. A vertical row of access ports is provided at one point in the circumference of the exterior of the reactor to permit the insertion of fuel elements. The central portion of the reactor core terminates somewhat short of its axis, thereby providing a central plenum for the ingress of coolant gas, and into which the expended fuel elements are expelled when fresh fuel elements are inserted.

In order to facilitate understanding, reference will be made to the appended drawing in which:

Figure 6 is a schematic diagram of an applicable gas clean-up system.

Figure 7 is a schematic diagram of a fuel reprocessing unit.

Figure 1:
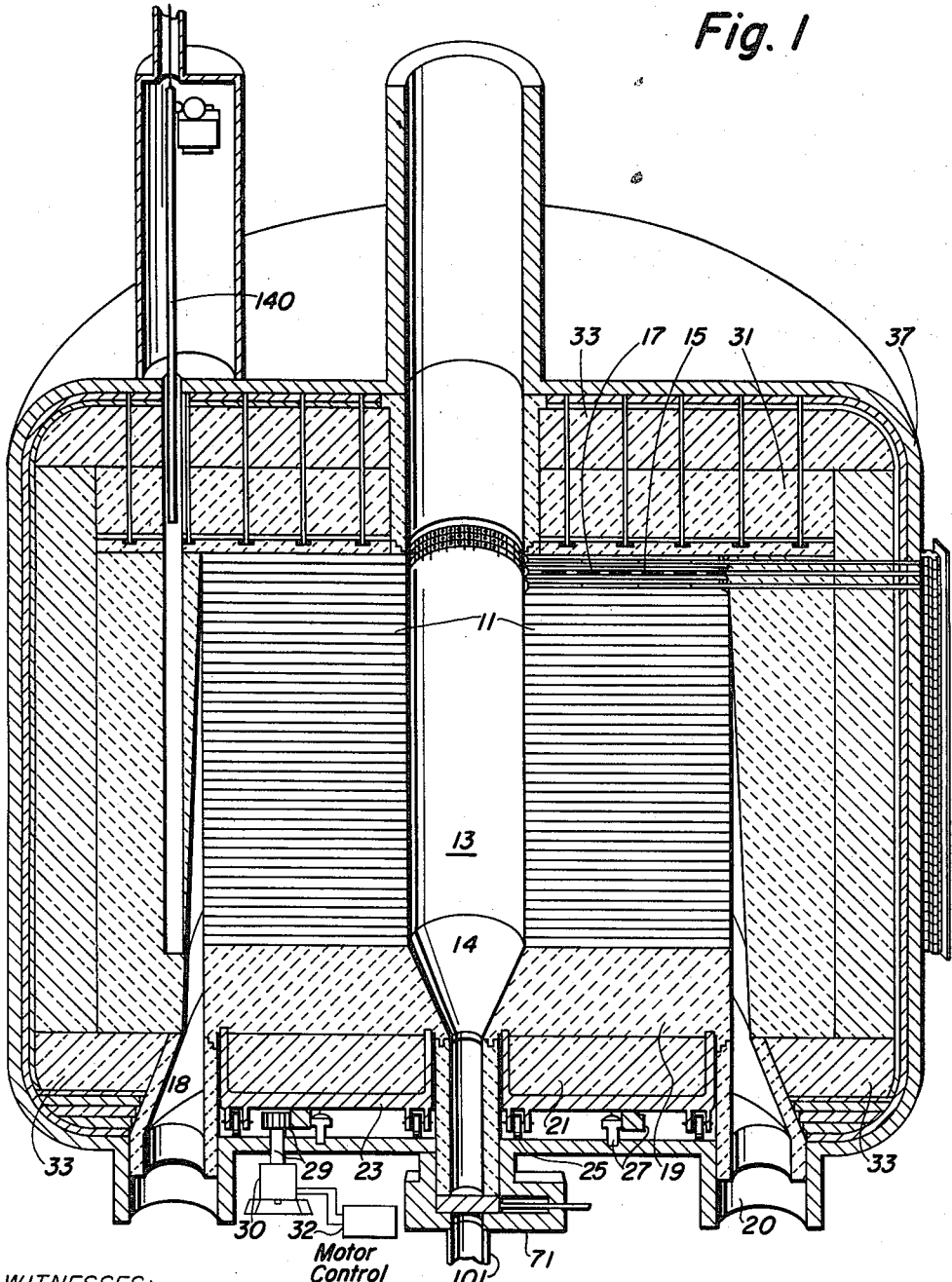
Figure 1 is a transverse vertical section through the reactor and a phantom view of the fuel rod replacement mechanism.

In a particular form of the reactor shown in the appended drawing, nitrogen gas is used as the coolant and the structure of one embodiment and its operational characteristics are as follows: The core or turret 11 is a graphite cylinder 9 feet in diameter by 6½ feet high. It has a central plenum having a diameter of 24 in. which provides an inlet coolant passage 13 and a spent fuel dump 14. Symmetrically and radially disposed in the core are 1440 fuel channels 15 (see Figures 2 and 3) which traverse the core radially from the central plenum to the outer periphery. The fuel channels 15 have a cross-sectional square shape and are arranged in 40 levels or layers with 36 channels in each level. The graphite fuel elements 17 are tubular in form and (again see Figure 2) are about ¾ in. in outside diameter, ½ in. inside diameter, and 6 in. long. Seven fuel elements are provided in each channel, thereby making a total in the reactor of 10,080. Each fuel element contains about two grams of 90 percent enriched uranium. The lower portion of the core rests upon a thick neutron reflector layer of graphite 19 which in turn rests upon refractory heat insulating material 21 and an iron shell 23. The iron shell, or base, is supported on trunnions 25 which permit the entire core to be rotated. An annular gear 27 is affixed to the nether surface of the iron base and is engaged by a spur gear 29 driven through a suitable shaft by motor 30. Control means 32 permits remote control of rotation of the core.

The core is surrounded on top and sides by 18 in. of graphite reflector 31 which is stationary, and this is enclosed in about 12 in. of insulating refractory 33. Surrounding the refractory is a steel, or cast iron, thermal shield 35 and finally a steel pressure vessel 37 to contain the coolant which will be sustained at a pressure of about 500 pounds per square inch.

The inner wall of the stator or reflector portion of the reactor is tapered back as shown from top toward the bottom to provide a volume expanding exhaust plenum 18. The hot gases pass out of exhaust plenum 18 through annular port 20 to utilization means such as a high pressure turbine shown in Figure 6.

Figure 2:
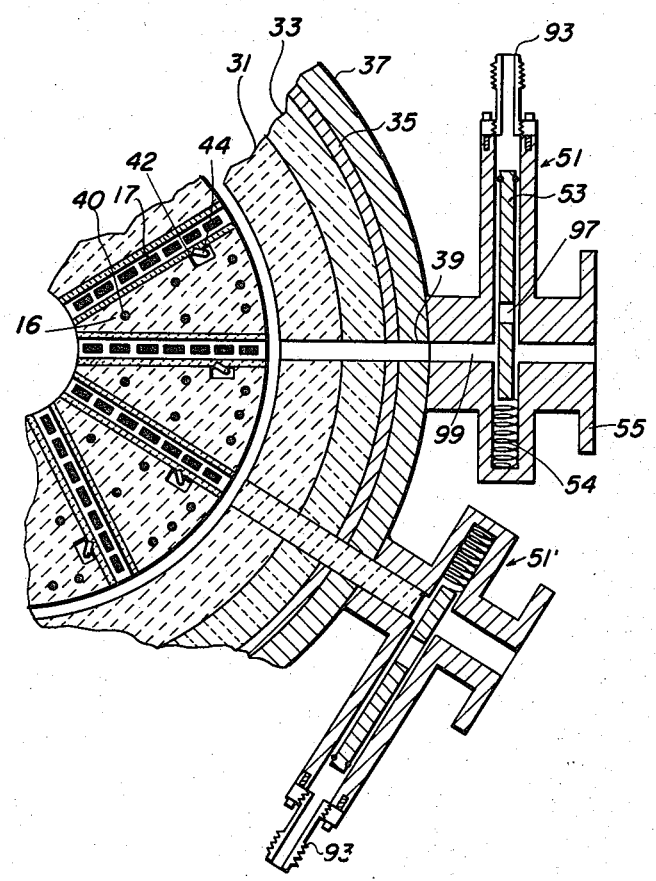
Figure 2 is a horizontal cross section of the reactor and loading valve assembly.
Figure 3:
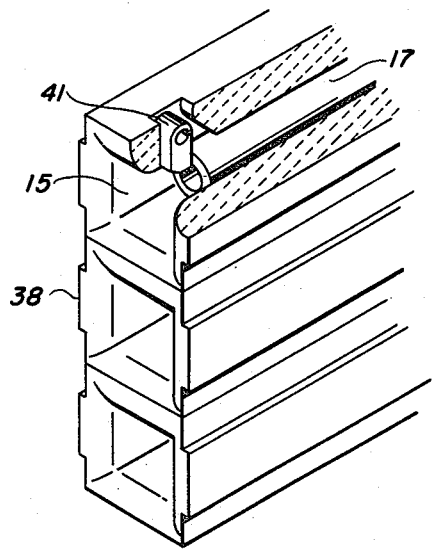
Figure 3 is a fragmentary prospective view of the fuel slug and supporting channel.
Figure 4:
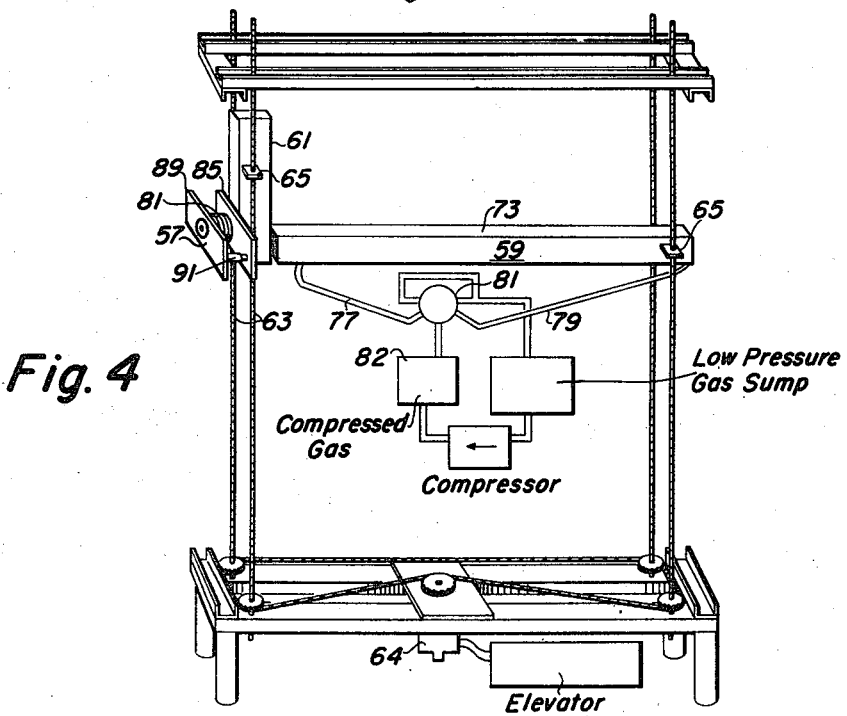
Figure 4 is a cross-sectional view of the loading ram.

Referring to Figures 2, 3 and 4, for details of the core:

Fuel elements are loaded at the periphery of the core and are stepwise moved toward the center as burnup proceeds. Referring to Figure 2, a passage 39 slightly larger than the cross section of a fuel element is provided through the reflector and vessel at each fuel element level. This passage permits a new fuel element to be pushed into the outermost core position in the fuel channel. A latch 41 (see Figure 3) is mounted in one wall of each fuel channel proximate its outer extremity to prevent the fuel elements from moving outward as the consequence of a gas pressure gradient along the length of each channel. Rotation of the core brings each of the 36 channels in turn to the loading position.

The core is constructed of graphite fuel supporting channels 15 and sector-shaped graphite elements 16. The channels are provided with protruding ribs 38 which interlock with corresponding channels (not shown) in the sectors. The channels and the sectors are interlocked with each other to form a unitary structure. Vertical graphite rods 40 pass through all the vertical sector layers. Each channel is locked in place by a dog latch 44 supported in the adjacent graphite sector. Although these latch members are shown to be supported on vertical pivots for ease of illustration, in practice they are supported on horizontal pivots in order to permit latching by gravity force.

A second vertical array of openings 39' is provided through the wall of the reactor. These openings are of a size to permit the insertion of new fuel channels as needed. A slug 43 of refractory or moderator material desirably closes opening 39' to preserve the reflecting symmetry of the reflector geometry.

Figure 5:
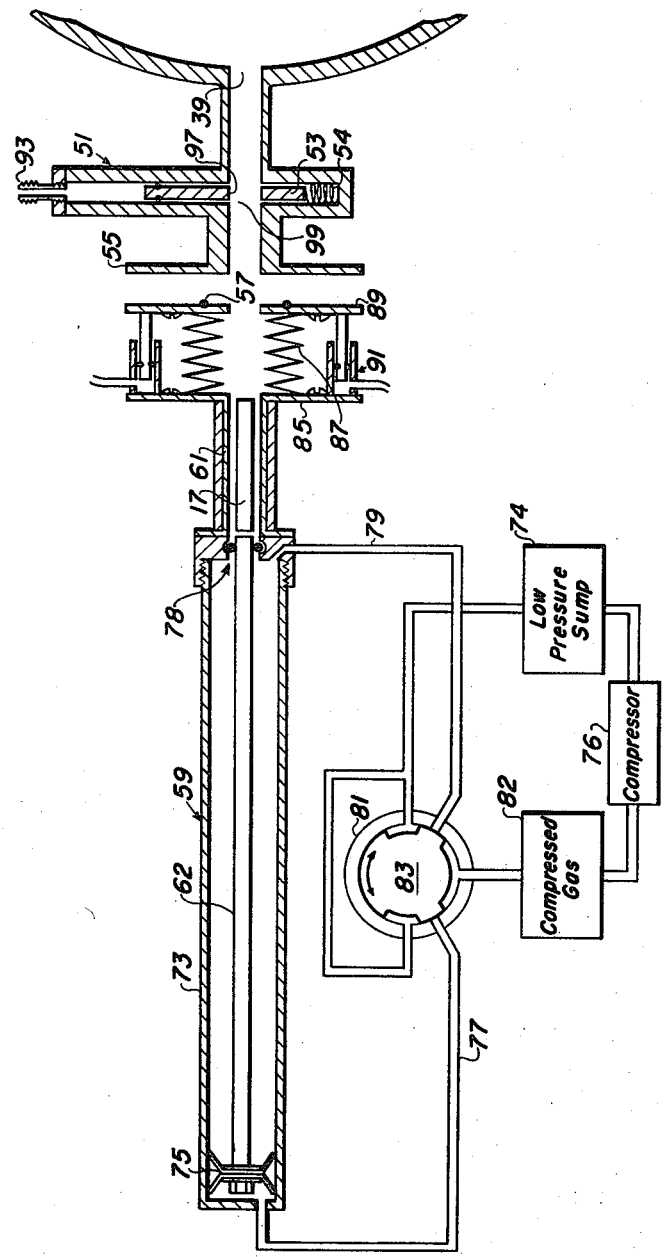
Figure 5 is a schematic diagram of one suitable closed-cycle gas turbine power plant.

The fuel loading mechanism can take any of a number of forms, but for purposes of illustration the mechanism of Figures 2, 4 and 5 is shown. Gate valve assembly 51 is affixed to the exterior surface of the pressure shield and a valve and port 99 communicate with the fuel loading opening at each level. As a consequence, a vertical stack of such valves is provided as shown in Figure 1. The gate valve assembly includes a slide valve gate 53 which can be moved to the open position against the force of spring 54 by gas pressure admitted through port 93 to provide an unobstructed passageway for the accommodation of the movement of a fuel element therethrough. The outer extremity of the slide gate valve assembly 51 is provided with a flange 55 to permit cooperation with gasket 57 (shown in Figure 5). The loading ram 59 communicates with the lower portion of shielded hopper 61 (see Figure 4). The shielded hopper 61 has a width slightly greater than the diameter of a fuel element and has a height sufficient to permit the stacking of 36 fuel elements. The ram 59 is connected to the hopper near the bottom so that it will engage the lowest fuel element. As soon as one fuel element is inserted into the reactor and the ram withdrawn, the fuel elements descend by force of gravity so that a fuel element again rests against the floor of the hopper. The loading ram and shielded hopper are supported on four elevator screws 63 which are chain-driven by means of motor 64. The hopper and loading ram are provided with threaded flange members 65 for cooperating with the threaded elevator members.

The details of the loading ram and shielded hopper are shown in Figure 5. A pneumatically operated plunger 62 is housed in pressure cylinder 73. One or more two-way pistons 75 are affixed to the plunger so that the same can be controllably urged either to the right or to the left by the admission of gas under pressure. The ram cylinder is isolated from the reactor gas and gas pressure by gland 78. Gas ducts 77 and 79 communicate with the ends of the pressure cylinder 73 and are connected to a double two-way valve 81. A source 82 of compressed gas is connected to the valve so that the manipulation of the valve control rotor 83 admits gas under pressure selectively to the left-hand or right-hand of the pressure cylinder 73. At the same time that pressure is admitted to one end of pressure cylinder 73 the other end of the cylinder communicates directly with a low pressure sump 74. The gas in the sump, if pure nitrogen or helium, is compressed in compressor 76 and returned to high pressure container 82. Forward of and affixed to the pressure cylinder 73 of the loading ram is the hopper 61 which is provided with outwardly extending flange 85 at its outer extremity. Affixed to this flange is a hermetically tight accordion-pleated extensible member 87. The outer end of element 87 is hermetically sealed to plate member 89. Plate 89 is provided with a groove in which is affixed a resilient gasket member 57. A pair of pneumatic or hydraulic cylinders 91 are positioned between plates 85 and 89 so that the admission of fluid pressure causes an outward translation of sealing plate 89 to thereby compress gasket 57 against gate valve assembly flange 55 and thereby provide complete hermetic sealing of and maintenance of pressure in the interior of the hopper, the gate valve assembly, and the reactor, with respect to the outside thereof. The loading of fresh fuel elements at any one station point is accomplished as follows: The reactor core is rotated to the selected index position and the loading ram and shielded hopper are raised to the selected fuel channel position. It is apparent that any other order of loading may be selected but the most convenient order of loading is rotation-wise. With the hopper in the selected position, fluid pressure is applied to hydraulic cylinders 91 so that sealing plate 89 with gasket 57 is forced into hermetically tight relationship with valve assembly flange 55. Pneumatic pressure is now admitted into port 93 of slide valve gate 51 to thereby force valve gate 53 to a position whereby slide valve aperture 97 is aligned with the fuel element passageway 99 (Figure 2) of the slide valve assembly. Next, rotor 83 of valve 81 is manipulated to admit high pressure gas to the left-hand end of ram 59 so that plunger 62 is urged to the right and pushes fuel element 17 to the right through the slide valve assembly into the reactor channel, a distance of one fuel element length. The two-way valve 81 is then manipulated to its alternate position, thereby withdrawing plunger 71 to the left end and when it has reached its at-rest position another fuel element will descend to the lowermost position in the hopper.

This procedure having been completed with respect to one fuel channel element, the reactor core or turret is rotated one step and the same process is used in injecting the next fuel element. Thus the fuel elements can be advanced one step in an entire level of the reactor with one opening of the port. Upon the completion of advancing all the fuel elements in one level, fluid pressure is removed from slide valve 51 which therefore closes. Pressure is next removed from hydraulic cylinders 91 so that pressure plate 89 is retracted along with gasket 57 a short distance from slide valve assembly flange 55. The loading ram can now be lowered one step by energization by motor 64 in order to repeat the process at the next lower fuel channel level.

A similar system utilizing gate valve assembly 51' is provided for replacing fuel channel members as needed. Other than required changes in size, the mechanism and process is similar to the above described mechanism for replenishing fuel elements.

The insertion of fresh fuel by the loading ram also accomplishes the discharge of fuel which has reached a degree of burnup which makes it desirable to replace it. As a new fuel element is inserted it pushes the others in the channel ahead and the inner one, most highly burned up, falls down the central plenum into a graphite or carbon lined hopper or fuel dump 14. The fuel dump 14 is provided with a slide gate valve 71 which is pneumatically operated to discharge the spent fuel elements into reclaiming apparatus.

If it is assumed that reprocessing of the elements is desirable when burnup reaches 10 percent, an average heat output power level of the reactor of 60 megawatts requires reloading about 350 elements per day or one hopper full every two and a half hours. In this power and burnup the average service time of a fuel slug is one month.

The crushed fuel elements discharged from the fuel dump can, for a small plant such as that herein described, be processed by a batch system. A full day's discharge of fuel elements requires the reprocessing of only 700 grams of uranium and the amount would be even less if higher than 10 percent burnup can be permitted.

The fuel reprocessing system involves a sequence of simple operations. The sequence is as follows:

(1) The fuel elements are physically transferred from the reactor hopper 14 to the reprocessing unit by alternately opening gate 71 and a second gate in series which can be similar to gate 71.

(2) The fuel is separated from the graphite by burning or chemical extraction.

(3) The fission product is separated from the fuel by the solvent extraction method.

(4) The reclaimed fuel and additional fuel as needed are added to new graphite involving the steps of impregnation and leaching.

(5) The fuel in the new graphite rods is converted to oxide or carbide.

(6) The new fuel rods are transferred to the reactor insertion ram hopper.

The fuel reprocessing system involves no techniques beyond the skill of the chemical engineer versed in the art, and detailed information is available in the literature, such as the article by Farrington Daniels entitled "Small Gas-Cycle Reactor Offers Economic Promise," on pages 34–44 of Nucleonics Magazine for March 1956.

A mode of preparation of the fuel rods is as follows: graphite cylinders 13 mm. and 73 mm. long with a 7 mm. hole and density 1.63 g./ml. is heated to 150° C. and vacuum impregnated for five minutes in boiling (120° C.) uranyl nitrate solution. The solution is permitted to cool slowly to about 60° C. and the rods are removed. The rods are dipped in distilled water and drained. After air drying for twenty hours they are maintained at a temperature of 66° C. for another sixteen hours. Next they are heated to 800° C. for twenty minutes in a stream of helium and then cooled rapidly in a vacuum.

Upon sectioning and X-ray examination of several of the fuel rods it was found that the uranium was uniformly distributed. It was determined in other tests that the quantity of uranium in the fuel element could be increased several fold by multiple loadings.

Although the manner of power utilization is not a necessary part of this invention a suitable suggested embodiment is shown in Figure 6 because the behavior of the prime mover is associated with the control of the reactor itself. Referring to the figure, the prime mover comprises high pressure turbine equipment driving a two-stage compressor with inter-cooler and on a separate shaft a low pressure turbine driving a useful generator load.

Nitrogen at 90° F. at 490 p.s.i. enters the low pressure compressor 120 and undergoes half of the required pressure rise. It is then cooled in inter-cooler 121 to 90° F. and enters the high pressure compressor 122 for final compression to 530 p.s.i. The high pressure gas is then passed through regenerator 123 and is heated by waste gases from low pressure turbine 119 to 727° F. The gas then passes through the reactor 100 and is heated to 1300° F. The heated gas proceeds to the high pressure turbine 118 where enough energy is extracted to drive both stages 120 and 122 of the compressor. The low pressure turbine 119 converts the remaining available energy into useful electrical output by means of generator 125. The gas discharge from the turbine exchanges heat in the regenerator with gas entering the reactor and then is returned to its initial state in pre-cooler 127.

Load changes are accommodated in two ways. Sustained changes in output are effected by varying the gas pressure level of the system. With this method of control, efficiency is substantially constant over a wide range of loads since the temperature differences and gas velocities within the system remain constant. The load changes are made by bleeding gas out of the system through control valve 127 into low pressure accumulator 129 or by adding gas to the system through valve 131 from high pressure accumulator 133. Make-up gas to supply any deficiency in high pressure accumulator 133 is supplied through valve 135 from high pressure gas bottle 137.

An extremely rapid change in load can be effected by by-passing the power turbine. This method of regulation is particularly effective in guarding against overspeed or accommodating sudden load-dump, as for example, in maneuvering a ship propulsion plant.

The reactor follows normal load swings by means of its negative temperature coefficient of reactivity. When the nitrogen pressure is reduced as directed above, the effect is to remove heat removable capacity allowing the reactor temperature to rise with resultant automatic reduction in power level. The steady state operating temperature would be adjusted by varying the fuel charging rate. Safety shutdown or rapid control is provided by means of boron loaded graphite rods 140 operating in the reflector 31.

During the operation of a reactor, solid fission products, graphite and uranium, will be present in the gas stream in the form of dust. Referring to Figure 7, a gas scouring system is shown. The gas, in passing from the reactor to the turbine through duct 140, is filtered by diagonal screen 142. The dust is deflected into gas cooler 143 and is then passed through electrostatic precipitators 145. After passage through electrostatic precipitators 145 the gas passes into an auxiliary compressor 150 so that the pressure is boosted as necessary to pass the gas back into the main system. A small bleed-off stream of the gas is diverted from the output of the precipitators and is passed through a second cooler 147 and from thence into charcoal traps 149. The charcoal traps are designed to remove fission product poisoners such as xenon, crypton, and iodine.

From the foregoing it is seen that a reactor of convenient operational design is provided which can directly power a gas turbine cycle. This combination has a number of attractive advantages over other types of reactors. The life of an unclad fuel element at the low power loadings used is high so that the reactor operating economics and processing costs are attractive. Ability to add and discharge fuel while at full power rating adds greatly to the safety and convenience of operation. The safety feature derives from the fact that a continuously loaded reactor requires no excess reactivity for burnout and poisoning compensation and therefore no devices are required for controlling the excess. The plant factor and availability are increased by as much as 5 to 10 percent by eliminating fueling shutdowns and the life of the equipment is increased because of fewer start-up stress cycles.

A feature of advantage to the herein described heat transfer mechanism is a steady state temperature and power profile. In accordance with the present teachings the fuel is loaded at the periphery of the reactor and is moved slowly toward the position of highest flux in the center where it is discharged. This radial fuel motion not only helps to reduce the central flux peak but keeps all parts of the reactor at a substantially steady state of temperature and power distribution.

Although the preferred embodiment has above been described as utilizing nitrogen, it is apparent that helium and carbon dioxide may also be used with only minor variations in cycle efficiency. Nitrogen has been selected as the working fluid because it has the advantage that it eases the turbo machinery design problems. Although helium is a better heat transfer medium, it requires more stages and therefore special turbo machinery. In any case, the present teachings are applicable to helium turbo machinery and the only change required would be that the reactor flow area and, therefore the over-all reactor size, would be somewhat reduced.

It is understood that the spirit of this invention contemplates the utilization of a turret-type heterogeneous graphite-fuel reactor in which a coolant gas passes directly over the reactor elements. Although these teachings have been applied to a specific example, it is apparent that other modifications and variations may be possible and it is our intention to cover any of such modifications which fall within the spirit of this invention. Accordingly, it is understood that this invention is to be considered limited only by the appended claims taken in view of the prior art.

What is claimed is:

1. A heterogeneous gas-cooled nuclear reactor comprising a pressure containing vertically elongated cylindrical metal stationary housing and a rotatable nuclear reactor core, said housing supporting adjacent the inner surface of its top, bottom and lateral walls a thick layer of thermal insulating refractory material, and against the inner surface of the refractory material a thick layer of neutron reflecting material, said core being cylindrical in horizontal cross section and comprising a plurality of radially directed fuel element supporting channel members, a plurality of sector-shaped neutron moderating elements filling the space between said channel elements and being interlocked together and with said channel members, said channel members and sector elements having their inner ends spaced from the axis of rotation to provide a central plenum, a plurality of tubular nuclear fuel elements loosely supported in said fuel channel members, said core outer periphery and said housing reflecting material inner surface being spaced to provide an annular duct, means for urging fluid coolant into said central plenum, over and through said fuel elements and out said annular duct to transfer heat energy out of said reactor.

2. The reactor of claim 1 in which the central plenum extends through the top and bottom of said reactor core and housing to provide a spent fuel disposing passage at its lower end.

3. The reactor of claim 2 in which the core fuel channels are arranged in vertical arrays, a vertical array of ports corresponding in number and spacing to a core channel array passing through the thermal insulation layer, the refractory layer and the housing wall, said ports having a cross section of generally the size of the fuel channels, a valve connected to the outer end of each of said ports, and means, when a selected valve is open, for inserting fuel elements into the corresponding channel of the core, and means for rotating the core whereby fuel elements can be inserted in a plurality of the channels in the core in one layer with one operation of said selected valve.

4. The reactor of claim 3 in which a second vertical array of ports is provided in said reactor housing wall, this array being similar in arrangement to said first array, but the cross section of the ports being slightly larger than the outer cross section of the fuel channel elements.

5. The reactor of claim 4 in which a latch is provided in each fuel channel member proximate the outer end thereof to prevent outwardly directed movement of the corresponding fuel elements.

6. The reactor of claim 5 in which a latch member is provided in each reactor core sector element to prevent outwardly directed movement of the corresponding fuel channel member.

7. The reactor of claim 1 in which said annular duct is graduated in cross section from one end of the reactor to the other to provide a uniform coolant fluid pressure drop through the layers of fuel element channel members.

8. A heterogeneous nuclear reactor comprising a stationary housing and a rotatable core, said core being supported for rotation about its vertical axis and containing a plurality of radial fuel element supporting channels arranged symmetrically in each of a plurality of horizontal planes, and corresponding channels in the plurality of planes being aligned in vertical planes to constitute vertical arrays, said core being annular in horizontal cross section, thereby providing a central plenum, said core outer periphery being tapered in radius from one end to the other, thereby providing a coolant constant velocity egress duct between the core and the housing, means for circulating the coolant through said central plenum, fuel element supporting channels and the egress coolant duct, said reactor stationary housing being provided with at least one vertical array of ports, one each on a plane with each of the horizontal planes of the fuel element supporting channels and a valve hermetically affixed to the housing at the outer end of each of said ports.

9. The reactor of claim 8 in combination with a fuel hopper and a loading ram, said hopper and ram being vertically slidably supported in the plane of said vertical array of ports and valves, and a central portion of the reactor housing lower wall being provided with a spent-fuel hopper and a discharge gate, whereby the insertion of fresh fuel elements by said loading ram discharges the spent-fuel elements into the central plenum and spent-fuel hopper.

10. The reactor of claim 9 in which the coolant is a gas and is continuously circulated through said reactor in a heat energy utilization system, means in said utilization system for screening said gas to remove solid particles, and means in said utilization system for removing nuclear product poisons from said gas.

References Cited in the file of this patent

UNITED STATES PATENTS

| | | |
|---|---|---|
| 2,708,656 | Fermi et al. | May 17, 1955 |
| 2,725,993 | Smith | Dec. 6, 1955 |
| 2,780,596 | Anderson | Feb. 5, 1957 |
| 2,790,760 | Powell | Apr. 30, 1957 |

OTHER REFERENCES

TID-5275, pages 316–317, Aug. 18, 1955.